United States Patent
Kurie

[15] 3,668,993
[45] June 13, 1972

[54] DEVICE FOR VIEWING INDICIA
[72] Inventor: Hiroshi Kurie, Tokyo-to, Japan
[73] Assignee: Asahi Kogaku Kogyo Kabushiki Kaisha, Tokyo-to, Japan
[22] Filed: Aug. 11, 1970
[21] Appl. No.: 62,896

[30] Foreign Application Priority Data
Aug. 27, 1969 Japan..............................44/80767

[52] U.S. Cl................................................95/42, 350/114
[51] Int. Cl...................................G02b 27/32, G03b 19/12
[58] Field of Search.....................350/114, 115, 116; 95/42; 356/227, 228

[56] References Cited

UNITED STATES PATENTS 1,740,970  12/1929  Chronik et al.....................350/116 X
2,714,329   8/1955  Pfaffenberger.......................350/228

FOREIGN PATENTS OR APPLICATIONS 1,293,572   4/1969  Germany..................................95/42

Primary Examiner—John K. Corbin
Attorney—Steinberg & Blake

[57] ABSTRACT

A device for viewing one of a plurality of indicia. At least one pair of indicia are provided, and an elongated light-permeable shaft forms a carrier which carries the pair of indicia. The indicia are angularly displaced by 180° about the axis of the shaft and are axially displaced therealong by a distance at least equal to the axial space occupied along the shaft by each of the indicia. A transmission is available to the operator for rotating the shaft about its axis, and in one angular position of the shaft one of the indicia is in alignment with a frame to be viewed therethrough. By operating the transmission it is possible to rotate the shaft through 180° while at the same time axially displacing the shaft by a distance equal to the axial distance between the pair of indicia in a direction which will enable the other of the indicia to occupy the position formerly occupied by the first of the indicia when the shaft is in the particular angular position where the first of the indicia is in alignment with the frame, so that in this way one or the other of the indicia can be positioned in alignment with the frame to be viewed therethrough.

10 Claims, 5 Drawing Figures

PATENTED JUN 13 1972 3,668,993

INVENTOR
HIROSHI KUREI

BY
Steinberg and Blake
ATTORNEYS

DEVICE FOR VIEWING INDICIA

BACKGROUND OF THE INVENTION

The present invention relates to devices which make it possible to view one of a plurality of indicia. Thus, the present invention is particularly applicable to structures such as cameras where selected indicia are rendered visible in the viewfinder when the operator looks into the viewfinder.

When dealing with structures of this latter type, there is only a limited amount of space available for rendering one of a plurality of indicia visible to the operator. Thus, when the operator looks into the viewfinder in order to view the object which is to be photographed, the operator also should be made aware of certain additional factors such as particular exposure multiples, the exposure time setting, the aperture setting, etc. Because of the extremely limited space which is available in structures of this type, considerable difficulty is encountered in making it possible for an operator of a camera or the like to view one of a plurality of indicia.

SUMMARY OF THE INVENTION

It is accordingly a primary object of the present invention to provide a construction which will solve the above problem.

In particular, it is an object of the invention to provide a construction which will make it possible for an operator to view one of a plurality of indicia under circumstances where the structure which renders the indicia visible must be accommodated in an extremely limited space.

It is particularly an object of the present invention to provide a structure for rendering one of a plurality of indicia viewable in a viewfinder of a camera.

It is especially an object of the invention to provide a construction of this type which will make it possible for the operator of a single-lens reflex camera to view one of a plurality of indicia in the viewfinder of the camera with practically no interference in any way with the image which is normally seen in the viewfinder of the camera.

It is furthermore an object of the present invention to provide a construction which makes it possible for the operator to determine from the exterior of the camera or the like that one of the plurality of the indicia which will become visible.

According to the invention at least a pair of indicia are carried by rotary carrier means which has an axis of rotation and which carries the pair of indicia angularly displaced by 180° one with respect to the other about this axis while axially displaced with respect to each other along the latter axis by a distance at least equal to the distance along the latter axis occupied by each of the indicia. A stationary frame means is located adjacent the carrier means and one of the indicia is in alignment with the frame means to be viewed therethrough when the carrier means is in a given angular position. An operating means coacts with the carrier means to rotate the latter about its axis through 180° while simultaneously displacing the carrier means along its axis in a direction and by a distance which will situate the other of the indicia at the location occupied by the first of the indicia when the carrier means is in its given angular position, so that in this way it becomes possible to align the other of the indicia with the frame means. Thus, it is possible to select one or the other of the indicia to be viewed through the frame means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
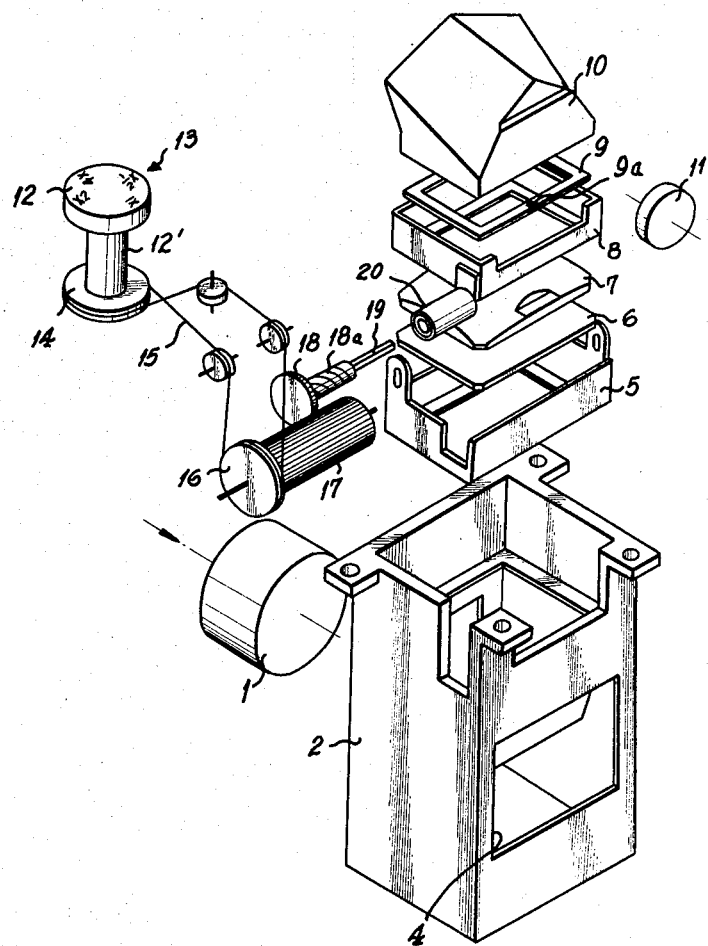
FIG. 1 is the perspective illustration of an embodiment of the invention incorporated into the viewfinder of a single-lens reflex camera.

The structure of the invention described below and illustrated in the drawings is particularly adapted for incorporation into a viewfinder of a single-lens reflex camera and is suitable particularly to indicate indicia such as exposure multiples, diaphragm values, shutter speeds, or operations such as completion of film transport.

Figure 2:
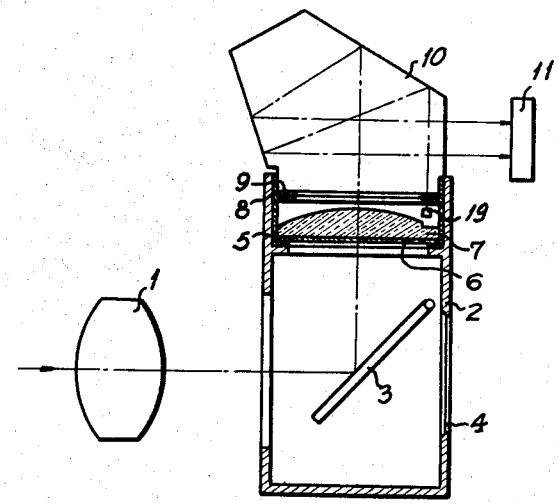
FIG. 2 is a schematic sectional elevation showing further how the structure of the invention is incorporated into the viewfinder.

Referring to FIGS. 1 and 2, there is schematically represented therein the objective 1 of a single-lens reflex camera. Behind the objective 1 is situated the mirror box 2 in which a tiltable reflecting mirror 3 is located, as schematically represented in FIG. 2. Behind the mirror 3 the rear wall of the box 2 is formed with an opening 4 which forms a film gate and has a suitable size and configuration so as to form a frame about the image to which the film behind the gate 4 is exposed when the mirror 3 is tilted upwardly so that it does not extend across the optical axis.

The upper portion of the box 2 carries a frame 5 which supports a condenser lens 7 together with a Fresnel lens 6 situated directly beneath the condenser lens 7 and carried by the frame 5 in the manner apparent from FIGS. 1 and 2. This frame 5 fixedly carries an upper frame 8 which serves to support a pentaprism 10. A frame member 9 extends along the peripheral lower edge of the prism 10 and forms a mask the inner periphery of which frames the image.

Figures 3, 4:
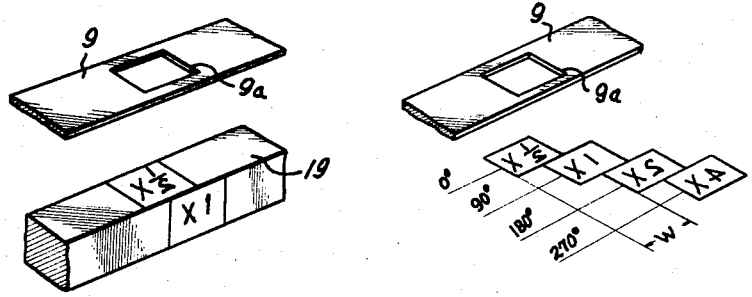
FIG. 3 illustrates in a fragmentary enlarged perspective view the manner in which a selected one of a plurality of indicia is aligned with a frame means.
FIG. 4 is a schematic representation illustrating the distribution of the several indicia.

This mask 9 has an elongated portion, shown on an enlarged scale in FIGS. 3 and 4, formed with a square or rectangular opening 9a, and this part of the structure forms a frame means through which a selected one of a plurality of indicia is visible in a manner described below.

The viewfinder includes a rear ocular 11 through which the operator looks into the viewfinder in a well known manner.

A manually operable operating means is available to the operator for a purpose referred to below, and this operating means includes a rotary knob 12 which can be turned by the operator and which forms part of an indicator to the extent that it carries at its upper exposed surface a series of indicia, as is apparent from FIG. 1. A selected one of these indicia can be placed in alignment with a stationary index 13 carried by a stationary outer surface of the camera, so that in this way the operator can determine the angular position to which the knob 12 is to be turned.

This knob 12 is fixed to a rotary stem 12' which extends in a light-tight manner, for example, into the interior of the camera where the stem 12' is fixed with a rotary pulley 14. A cable 15 extends around the pulley 14 as well as additional guide pulleys, schematically represented in FIG. 1, and this cable 15 also extends around a driven pulley 16. This pulley and cable structure forms part of a transmission which includes an elongated transmission gear 17 fixed to the pulley 16 to rotate therewith and meshing with a driven gear 18. This gear 18 will rotate in response to rotation of the gear 17 and at the same time is capable of shifting axially along the gear 17 with which the gear 18 meshes.

This gear 18 is coaxially fixed with a screw 18a of a relatively long pitch. This screw 18a is in turn fixed coaxially with an elongated carrier means 19 in the form of a light-permeable shaft. Thus, the shaft 19 which forms the carrier means may be made of a transparent or transluscent body of material such as a suitable glass or plastic, and in the illustrated example the shaft 19 is of a square cross section.

The frame 8 fixedly carries an elongated internally threaded sleeve 20 which extends through a notch formed in a side wall of the frame 5 as well as through a notch formed in a side wall of the box 2, and these notches are visible in FIG. 1. The threads of the screw 18a are received in and mate with the internal threads of the sleeve 20 which forms a stationary nut in which the screw 18a turns, so that in response to turning of the gear 18 the carrier means 19 will be angularly rotated and axially displaced. Thus, the components 12–18, 18a, and 20 form an operating means operatively connected with the carrier means 19 for rotating and axially displacing the latter.

In the particular example illustrated, the indicia take the form of exposure multiples, and in the illustrated example one pair of diametrically exposed indicia are the multiples ½X and 2X, while another pair of diametrically opposed indicia are 1X and 4X. The several indicia are respectively carried by the several flat faces of the shaft 19, being imprinted thereon, for example. Thus, the pair of indicia ½X and 2X are angularly displaced by 180° with respect to each other, and as schematically represented in FIG. 4, they are axially displaced one with respect to the other by the distance W which is equal to the axial distance occupied by each of the indicia along the axis of the shaft 19 which forms the carrier means. In the same way the other pair of indicia are axially spaced from each other by the same distance W while they are angularly displaced from each other by 180°. However, in the illustrated example each of the pair of indicia 1X and 4X are angularly displaced with respect to the indicia ½X and 2X by 90° so that the indicia of the second pair alternate with the indicia of the first pair.

If the diametrically opposed pairs of indicia were in axial alignment with each other, then when light travels through the shaft 19 to illuminate the indicia, there would be a pair of superimposed indicia providing a confusing indication. Instead, the axial displacement for the several indicia described above and shown in the drawings makes it possible for only one of the indicia to be situated at one time in alignment with a frame means formed by the member 9 at its aperture 9a. Thus, in the position of the part shown in FIG. 3, the indicium ½X is in alignment with the frame means formed by member 9 and its aperture 9a. As is apparent from FIG. 2, at this time an illuminating means formed by the mirror 3 will direct light through the shaft 19 so that the single indicium shown on the upper face of the shaft 19 in FIG. 3 will be rendered visible through the frame means. Upon turning of the shaft 19 through 180° through the above-described operating means, it will be possible for the operator not only to angularly turn the shaft 19 but also to displace it axially so that the position occupied by the indicium ½X in FIG. 3 will now be occupied by the indicium 2X. Of course rotating the shaft 19 through 90° will locate the next indicium 1X in alignment with the frame means.

The several graduations or indicia on the top surface of the knob 12 can be selectively aligned with the index 13 so that the operator will know which of the indicia is aligned within the viewfinder with the frame means 9, 9a. The pitch of the threads of the screw 18a are such that the axial displacement will bring into alignment with the frame means the particular one of the indicia which becomes located at an upper flat region of the shaft 19 after the latter has been turned through a selected angle as described above.

Figure 5:
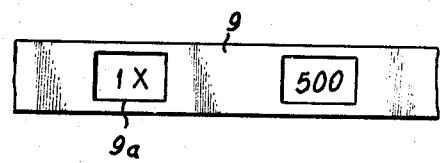
FIG. 5 is a fragmentary illustration of part of another embodiment of the invention.

Although in the structure described above there are several indicia situated on one side of the viewfinder, the structure may be duplicated at each side of the viewfinder or the shaft 19 may be extended so that through the member 9 which will have a pair of framing apertures, and as shown in FIG. 5, a pair of indicia will be visible. In other words the indicia shown in FIG. 5 may be located on the same flat surface of a single shaft 19 or a pair of the shafts may extend into the viewfinder from opposite sides and can be independently actuated by a pair of operating means to locate a selected pair of indicia in alignment with a pair of frame means to be visible therethrough as indicated in FIG. 5.

Of course, the above structure is illustrated only by way of example. The shaft 19 may be of hexagonal or octagonal cross section and may have an increased diameter to accommodate more indicia. The carrier means may itself be light-permeable or transluscent so that it is possible to direct the light through the shaft to render a selected one of the indicia visible in the manner described above and without any noticeable relative displacement of the indicia.

In the case where relatively simple indicia are provided, the shaft 19 can be of a circular cross section forming a cylinder instead of having an angular cross section as shown, and in this case also the rotary and axial movement of the carrier means will provide the required indications. Although in the above embodiment the illuminating means is formed by light which has passed through the objective and which is reflected by the mirror, it is possible to provide an illuminating means in the form of a separate light source.

Thus, with the structure of the invention it is only the carrier means 19 itself which is required to enter into the interior of the viewfinder. This particular construction provides practical advantages in that an extremely small space is required in the viewfinder. Even though this space requirement is greatly reduced, it is possible to achieve a selected one of a plurality of indicia to be viewed or even a pair of indicia can be viewed in side-by-side relation, and the entire construction is relatively simple so that it can easily be incorporated into the assembly.

What is claimed is:

1. In a device for viewing a plurality of indicia, one pair of indicia, rotary, light-permeable, carrier means having an axis of rotation and carrying said pair of indicia angularly displaced one with respect to the other by 180° about said axis and axially displaced one with respect to the other along said axis by a distance at least as great as that occupied along said axis by each of said indicia, frame means defining an opening through which the indicia are viewed from one side of said frame means and with which one of said indicia is aligned when said carrier means is in a given angular position, said carrier means extending along said frame means at an opposite side thereof so that that one of said indicia which is aligned with said opening can be illuminated with light passing through said carrier means toward said opening of said frame means, and said distance of axial displacement of said indicia preventing simultaneous viewing of said indicia so that only that one of said indicia which is aligned with said opening of said frame means can be viewed at one time, operating means coacting with said carrier means for rotating the latter through 180° while axially displacing said carrier means through an increment equal to the axial distance between the pair of indicia and in a direction which will situate the other of said indicia in the position occupied by said one of said indicia when said carrier means is in said given angular position thereof, so that through said operating means one or the other of said indicia will become aligned with said frame means to be viewed therethrough, an additional pair of indicia having with respect to each other the same angular and axial relationship as said one pair of indicia, while said additional pair of indicia alternate with said one pair about said axis with said additional pair of indicia being axially displaced with respect to said one pair by a fraction of the axial distance between said one pair of indicia, so that said additional pair of indicia are in axial overlapping relationship with respect to said one pair of indicia, said operating means coacting with said carrier means for rotating and axially displacing the latter through an angle and linear distance required to place one of said additional pair of indicia in alignment with said opening of said frame means while displacing one of said first-named pair of indicia out of alignment with said opening of said frame means, so that irrespective of which one of all four indicia is aligned with said opening of said frame means there is situated at the side of said carrier means directed away from said frame means another one of said indicia which is axially displaced with respect to the one of the indicia aligned with the opening of the frame means by a distance equal to that occupied by each of the indicia along said axis of said carrier means, and at the same time all four indicia occupy along said carrier means a total axial distance less than the total axial distance of all four indicia added together, and illuminating means coacting with said carrier means for directing light through said carrier means toward said opening to that one of all of said indicia which is in alignment with said opening of said frame means, whereby only the latter one of all of said indicia will be visible at one time.

2. The combination of claim 1 and wherein said operating means is manually operable for giving to the operator a selection of which of said indicia will be placed in alignment with said frame means.

3. The combination of claim 2 and wherein said manually operable operating means includes an indicator for indicating to the operator which of the indicia is in alignment with the frame means.

4. The combination of claim 1 and wherein said frame means forms part of a camera viewfinder and is situated at an edge region of the viewfinder, said carrier means being situated alongside said frame means in the viewfinder while said operating means is situated outwardly beyond the viewfinder.

5. The combination of claim 4 and wherein said frame means includes an elongated member formed with said opening with which one of said indicia becomes aligned when located in said position of alignment, and said carrier being in the form of a light-permeable shaft extending along and being located adjacent said member of said frame means for situating one of said indicia in alignment with said opening upon rotation of said shaft by said operating means.

6. The combination of claim 5 and wherein said viewfinder forms part of a single-lens reflex camera and includes an upper pentaprism and an ocular through which said frame means is viewed.

7. The combination of claim 1 and wherein said four indicia are displaced angularly by 90° with respect to each other with said additional pair of indicia axially displaced with respect to said first-named pair of indicia by a distance equal to ½ the axial distance between the indicia of each pair, so that said operating means may rotate said carrier means through 90° increments in order to successively situate the four indicia at a position of alignment with said frame means.

8. The combination of claim 7 and wherein said frame means forms an elongated member of a viewfinder of a camera and is situated at an edge region thereof with said member being formed with said opening through which one of the indicia may be viewed when in said position of alignment, said carrier means being in the form of a light-permeable shaft carrying said indicia and extending into the viewfinder along and adjacent to said member, said operating means being situated at the exterior of the viewfinder.

9. The combination of claim 8 and wherein said shaft which forms said carrier means is of a square cross section and has flat exterior surfaces where all of said indicia are located.

10. The combination of claim 1 and wherein there are additional indicia at least one of which is angularly aligned with one of said pair of indicia.

* * * * *